United States Patent
Maag et al.

(10) Patent No.: US 10,374,932 B2
(45) Date of Patent: Aug. 6, 2019

(54) ARCHITECTURE FOR TESTING PROTOCOLS

(71) Applicant: INSTITUT MINES-TELECOM/TELECOM SUDPARIS, Evry (FR)

(72) Inventors: Stéphane Maag, Sainte Genevieve des Bois (FR); Xiaoping Che, Evry (FR)

(73) Assignee: INSTITUT MINES-TELECOM/TELECOM SUDPARIS, Evry (FR)

(*) Notice: Subject to any disclaimer, the term of this patent is extended or adjusted under 35 U.S.C. 154(b) by 165 days.

(21) Appl. No.: 15/034,409

(22) PCT Filed: Nov. 4, 2014

(86) PCT No.: PCT/IB2014/065783
§ 371 (c)(1),
(2) Date: May 4, 2016

(87) PCT Pub. No.: WO2015/063744
PCT Pub. Date: May 7, 2015

(65) Prior Publication Data
US 2016/0269270 A1 Sep. 15, 2016

(30) Foreign Application Priority Data
Nov. 4, 2013 (FR) ...................... 13 60794

(51) Int. Cl.
*H04L 12/26* (2006.01)
*H04L 29/06* (2006.01)

(52) U.S. Cl.
CPC .............. *H04L 43/18* (2013.01); *H04L 43/12* (2013.01); *H04L 43/50* (2013.01); *H04L 63/1408* (2013.01); *H04L 63/1425* (2013.01)

(58) Field of Classification Search
CPC ......... H04L 43/00; H04L 43/18; H04L 47/10; H04L 63/1416; H04L 63/1425; H04L 43/12; H04L 43/50; H04L 63/1408
(Continued)

(56) References Cited

U.S. PATENT DOCUMENTS 6,026,146 A * 2/2000 Nowka ................... H04M 1/24
379/29.01
6,519,723 B1 * 2/2003 Allred ..................... H04L 43/18
714/43
(Continued)

FOREIGN PATENT DOCUMENTS

WO 03/047280 A2 6/2003

OTHER PUBLICATIONS

Jan. 26, 2015 Search Report issued in International Patent Application No. PCT/IB2014/065783.
(Continued)

*Primary Examiner* — Harun Chowdhury
(74) *Attorney, Agent, or Firm* — Oliff PLC

(57) ABSTRACT

System for testing a protocol, which is active on an item of equipment, testing system including a monitor to continuously capture traces, corresponding to sequences of messages of protocol under test, a filter of the traces captured using formalized properties of the demands of protocol under test, to separate the traces into data and control parts, a temporary storage, and transfer module to transfer the filtered traces to a tester so as to emit verdicts by verifying whether the traces satisfy the demands of the formalized properties of the protocol under test, in the event of saturation of the tester leading to the emission of a notification of load, the transfer module interrupts the transfer of filtered traces to the tester and stores the traces at least partially in the temporary storage, particularly only their control parts,
(Continued)

Figure 1:
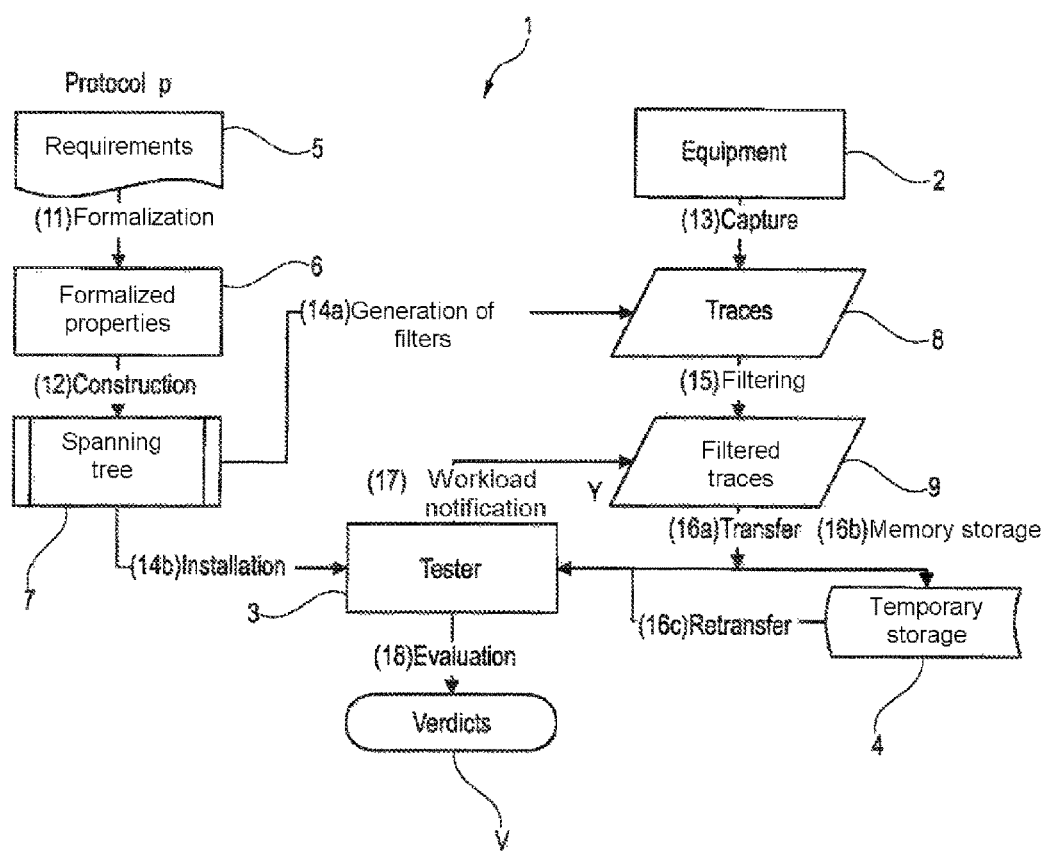

before resuming the transfer of filtered traces when the tester is again available.

24 Claims, 5 Drawing Sheets

(58) Field of Classification Search
USPC .......... 370/235, 241, 250, 252, 242; 714/39; 726/22, 26
See application file for complete search history.

(56) References Cited

U.S. PATENT DOCUMENTS

| | | | |
|---|---|---|---|
| 6,708,292 B1* | 3/2004 | Mangasarian | H04L 47/10 709/224 |
| 7,493,659 B1* | 2/2009 | Wu | H04L 63/1416 726/26 |
| 2003/0195721 A1* | 10/2003 | Hernandez | G01R 31/3177 702/187 |
| 2004/0054776 A1 | 3/2004 | Klotz et al. | |
| 2007/0115834 A1* | 5/2007 | Cuni | H04L 43/00 370/241 |
| 2007/0124456 A1 | 5/2007 | Jagadeesan et al. | |
| 2012/0079324 A1 | 3/2012 | Aphale | |
| 2016/0080281 A1* | 3/2016 | Kim | H04L 47/36 370/235 |

OTHER PUBLICATIONS

May 10, 2016 International Preliminary Report on Patentability issued in International Patent Application No. PCT/IB2014/065783.
Ghallab, Malik et al., "Managing Efficiently Temporal Relations Through Indexed Spanning Trees", International Joint Conferences on Artificial Intelligence, Aug. 25, 1989, XP 002726335, pp. 1297-1303.
Lalanne, Felipe et al., "Data-centric Property Formulation for Passive Testing of Communication Protocols", Recent Researches in Mathematical Methods in Electrical Engineering and Computer Science, Nov. 2011, pp. 176-181.
Lalanne, Felipe et al., "A Formal Data-Centric Approach for Passive Testing of Communication Protocols", IEEE/ACM Transactions on Networking, vol. 21, No. 3, Jun. 2013, pp. 788-801.
Che, Xiaoping et al., "A logic-based Passive Testing approach for the Validation of Communicating Protocols", ENASE 2012 conference, Poland, pp. 53-64.

* cited by examiner

ARCHITECTURE FOR TESTING PROTOCOLS

The present invention relates to a test system in the context of communications services and protocols engineering, particularly in networks, providing verdicts for functional protocol properties.

Communications are essential nowadays and because an increasing number of services is becoming available on-line, computer networks are continuing to expand and new communications services and protocols are constantly being developed. Communications standards are therefore essential to allow the various systems to interact and work together. These standards are formally checked, but their implementations may contain faults and need to be tested in order to check that they possess a set of desired properties and behave as expected.

A protocol is a set of communications rules and message formats that allows the entities of a distributed or non-distributed system to communicate.

There are two approaches for testing the conformance and performance of a communications protocol: a test called an active test, which checks the protocol being tested and observes how it behaves using simulation, and a test called a passive test which collects execution traces, notably binary ones, and analyzes them after the event. These traces correspond to message sequences entering and leaving the protocol, and comprise control parts and data, respectively corresponding to the header and to the body of the messages. The traces are generally chopped into packets of different sizes.

The passive test is thus applied "post-capture": finite traces, namely traces of determined size, are collected and analyzed. This approach is very difficult to automate and in many cases requires a formal model of the protocol, for example of unified modeling language (UML) or systems modeling language (SysML) type. Furthermore, working on finite traces increases the number of inconclusive verdicts, namely verdicts in which the status of the property being tested is uncertain, and of false-positives.

There are a great many known passive test solutions. These are notably offered by operators, service providers or research laboratories.

Some of these approaches are linked to a formal specification of the protocol being tested or to a formal monitor. This is notably the case of on-line monitoring work referred to as "runtime monitoring", namely monitoring performed while the protocol that is being tested is running, which are developed in research centers such as Technische Universitat Munchen. The disadvantage with these approaches is the need to construct a formal or semi-formal model of the protocol being tested beforehand.

Application WO 03/047280 describes the evaluation of the performance of a GPRS or 3G piece of equipment. In this approach, it is the equipment that is tested rather than the communications protocol, the technical specification for the protocol thus not being formalized.

US application 2007/0124456 describes an off-line test method entailing the collecting of traces. Inconclusive verdicts are not processed.

Other approaches are based on diagnostics and/or monitoring systems. This is notably the case with the tools supplied by industry, such as, for example, the EXFO or Microsoft Open Specification NM analysis tools. These high-performance tools seek to check and analyze the communications protocols but not to test them passively against properties from the technical specification and/or from the standards governing these protocols. The test is thus performed as a post-analysis, when an operator is alerted to an unexpected observation or an abnormal monitoring. These tools generate only a snapshot of the protocol in time but do not test it passively. Some of these tools provide series of tests, which can be likened a little to the active testing of the protocols.

Many approaches consider only the control part of the protocol traces observed. This then increases the incidence of false-positive verdicts.

Furthermore, certain passive on-line or "runtime" test approaches do exist, such as the solutions proposed by the Elvior company, but these are limited by the size of the buffer memories used. Breaks in testing therefore occur while these memories are being emptied, for example lasting ten seconds, and may lead to a high number of inconclusive verdicts.

There is therefore a need for continuous, non-intrusive, effective, on-line passive testing of the implementations of communications protocols by observing their execution traces and applying to them certain analysis methods that make it possible to provide a test verdict that establishes whether or not the protocol meets the technical specification and/or the standard.

Thus, one of the aspects of the subject-matter of the invention is a system for testing a protocol, notably a communications network protocol, running on a piece of equipment, notably the central processing unit of a computer, the test system comprising:
- a sniffer configured for continuously capturing traces, corresponding to message sequences of the protocol being tested,
- a captured-traces filter using formalized properties of the requirements of the protocol being tested, notably configured to separate said traces into data and control parts,
- a temporary-storage zone, and
- a transfer module designed to transfer the filtered traces to a tester configured to emit verdicts by checking whether the traces meet the requirements of the formalized properties of the protocol being tested, in which test system, if the tester becomes saturated leading to the emitting of a workload notification, the transfer module interrupts the transfer of the filtered traces to the tester and at least partially stores said traces in memory in the temporary-storage zone, notably only the control parts thereof, before resuming the transfer of the filtered traces when the tester becomes available again.

The invention provides a non-intrusive on-line passive test architecture that is transparent and that produces test verdicts autonomously by analyzing the execution of a protocol on line and in context without overloading the processor and memory of the equipment on which the test system is operating and on which the protocol is running. The users of the network may continue to work during the test. The less activity there is on the equipment, the more the test system can work.

In order to implement the invention there is no need to have a formal model of the protocol being tested, and only the protocol properties derived from the standard and/or from the technical specification governing the protocol are formalized.

The traces are analyzed on line, without being collected beforehand, and this makes it possible to automate testing on traces of almost infinite size and at the same time reduce the number of false-positives and of inconclusive verdicts.

The protocol may be observed continuously, without ever stopping the protocol and without ever interrupting the recording of the traces, despite their size. The workload notification notably makes it possible not to lose data even though the test is temporarily interrupted, so as to relieve the workload on the filters and the resources used on the equipment.

Formalization of Protocols

A communication protocol message is preferably a collection of data fields of various domains. The data domains may be defined as atomic or compound. An atomic domain may be defined as a set of numeric values or strings of characters.

A compound value v of size n>0 is defined by a set of pairs $\{(l_i, v_i) | l_i \in L \wedge v_i \in D_i \cup \{\in\}, i=1 \ldots n\}$, Where $W=\{l_1, \ldots l_n\}$ is a predefined set of labels and $D_i$ represent the data domains. The compound domain may then be defined as the set of all the values with the same set of labels and domains, defined by $\langle L, D_1, \ldots, D_k \rangle$.

For a given network protocol P, a compound domain $M_p$, may generally be defined by a set of labels and data domains derived from the format of the message defined in the protocol specifications. A message of the protocol P is any element $m \in M_p$. For each $m \in M_p$, a real number $t_m \in \mathbb{R}^+$ is added which represents the time when the message is received or sent by the equipment being tested.

For example, one possible message for the SIP protocol (Session Initiation Protocol bearing reference IETF RFC3261), specified using the definition above, is:

m={(method, 'INVITE'), (time, '644.294133000'),
(status, ∈), (From, 'alice@a.org'), (to, 'bob@b.org'),
(cseq, {(num, 7), (method, 'INVITE')})}

This message represents an INVITE request from alice@a.org to bob@b.org. The value of time '644.294133000' ($t_0$+644.294133000) is a relative value since the protocol interface, known as PO, started its timer, corresponding to the initial value $t_0$, when capturing traces. The interface also provides the relative time interval $T \subset \mathbb{R}^+$ for all the messages m of each trace.

A trace may be defined as a sequence of messages of the same protocol containing the interactions between a piece of equipment being tested in a network, via an interface PO, with one or more peers of the network during an arbitrary period of time. The traces are advantageously chopped into data packets.

A term may be defined in Backus-Naur form (BNF) as term ::=c|x|x.l.1 . . . l, where c is a constant in a certain domain, x is a variable, l represents a label and x.l.1 . . . l is called a selector variable.

A substitution is a finite set of bindings $\theta = \{x_1/\text{term}_1, \ldots, x_k/\text{term}_k\}$, where each $\text{term}_i$ is a term and $x_i$ is a variable such that $x_i \neq \text{term}_i$ and $x_i \neq x_j$ if $i \neq j$.

An atom may be defined as:

$$A ::= \overset{k}{\overline{p(\text{term}, \ldots, \text{term})}}$$
$$| \text{ term} = \text{term}$$
$$| \text{ term} \neq \text{term}$$
$$| \text{ term} < \text{term}$$
$$| \text{ term} + \text{term} = \text{term}$$

where p(term, . . . , term) is a predicate of label p and of arity k. The timed atom is a particular atom defined as $$\overset{k}{\overline{p(\text{term}_t, \ldots, \text{term}_t)}},$$

where $\text{term}_t \in T$.

The relations between terms and atoms may be established by the definition of clauses. A clause is an expression of the type: $A_0 \leftarrow A_1 \wedge \ldots \wedge A_n$, where $A_0$ is the header of the clause and $A_1 \wedge \ldots \wedge A_n$ is the body of the clause, $A_i$ being atoms.

A formula is defined in BNF by the following expression:

$$\phi ::= A_1 \wedge \ldots \wedge A_n | \phi \rightarrow \phi | \forall_x \phi | \forall_{y>x} \phi$$

$$| \forall_{y<x} \phi | \exists_t \phi | \exists_{y>x} \phi | \exists_{y<x} \phi$$

where $A_1, \ldots, A_n$ are atoms, $n \geq 1$ and x, y variables used to formally specify the message of a trace. The quantifiers $\exists_t$ and $\forall_t$ are commonly used to define the mathematical terms "it exists" and "for all" respectively.

Thus, the formula $\forall_x \phi$ means "for all messages x in the trace, $\phi$ holds". By using the operators and quantifiers described hereinabove, the formulae may be interpreted with verdicts T "PASS", ⊥ "FAIL" or ? "INC".

Test System

The temporary-storage zone, the sniffer, the transfer module and the tester of the test system according to the invention may be built into the equipment being tested. In an alternative, all of these elements or some of these elements are external to the equipment.

The tester may comprise a buffer memory.

The filtered traces may be stored in memory in the temporary-storage zone using chopping tables.

There are five distinct types of test verdict that may be returned by functional analysis of the observations of the traces: "PASS"—the trace meets the requirements; "FAIL"—the trace does not meet the requirements; "TIME-FAIL"—out of time; "INC"—inconclusive; and "temp-INC"—temporary inconclusive.

The out of time verdicts may arise as a result of the fact that the test is performed on line, and in real time. A rest time is advantageously used in order to stop looking for the target message with a view to providing status reports in real time. This rest time is generally the maximum response time written into the protocol. If the target message cannot be observed before the rest time, a "TIME-FAIL" verdict will be assigned to this property. This type of verdict is returned only if there is no time constraint in the requirements. In the latter instance, violation of this requirement will be manifested in a "FAIL" verdict.

Inconclusive verdicts may correspond to scenarios in which a request has been sent and a response is awaited, the status of the property being uncertain. These verdicts chiefly occur at the beginning and end of a test. If a property entails testing data and, because of the filtering, there is no data in the trace, only control parts, a temporarily inconclusive verdict may be assigned to the property which may then change to "PASS" or to "FAIL" when data begins to arrive from the storage zone again.

The test verdicts may be stored in files, so that they can be consulted at a later date in order to evaluate the protocol.

Protocol Test

The formalizing of the informal requirements of the protocol being tested may be performed by the test system. This formalizing may be performed using syntax and semantics based on the Horn logic and may lead to the creation of formulae, as described in the articles "*Data-centric property*

*formulation for passive testing of communication protocols*" by Lalanne et al, IASME/WSEAS, AC'11/MMACTEE'11, pages 176 to 181 and "*A formal data-centric approach for passive testing of communication protocols*", by Lalanne et al, IEEE/ACM Transactions on networking. The Horn logic makes it possible to have simplified syntax.

In an alternative form, the informal requirements of the protocol being tested are formalized by an external module upstream of the test method, the resultant formulae being supplied to the test system, for example in the form of files, while at the same time complying with the protocol requirement formalization syntax.

An index spanning tree is then advantageously constructed from all the formulae representing the formalized properties. Each quantifier of each formula passes through the tree in order to construct the nodes. The advantage of such a tree is that it eliminates redundant links and keeps only the links of greatest interest.

The tree may be constructed by using the following algorithm:

---
Algorithm Tree Generation (K, T, S)
---

Input: Set of Quantifiers S. Quantifiers K. Quantifier K containing the clauses and atoms. T represents the final spanning tree
Output: ⊤ if the Tree T has a solution.
(a)   if S is not empty then
(b)      for K ∈ S and K is not empty do
(c)         A ← pop(K)
(d)         solved ← ⊥
(e)         for ($B_0 \leftarrow B_1 \wedge ... \wedge B_q$) ∈ K do
(f)            for (0 < i < q, 0 < j < m) do
(g)               if ($B_i$ ∈ $T_j$) then
(h)                  if (!exist($B_i$, $T_j$)) then
(i)                     build($B_i$, $T_j$)
(j)               else i++
(k)              push($B_0, B_1 \wedge ... \wedge B_q$, K)
(l)              pop($B_0, B_1 \wedge ... \wedge B_q$, K)
(m)           else j++
(n)         solved ← ⊤
(o)         K ← pop(S)
(p)   else useSolution(S)
(q)   return ⊤

---

The spanning tree may be constructed by the test system. In an alternative, the spanning tree is constructed by an external module, upstream of the test method, and is supplied to the test system, for example in the form of files.

The sniffer may capture the traces of the protocol running on the equipment being tested continuously and successively. When the messages are captured, each message is preferably time-and-date stamped.

The spanning tree is advantageously applied to the captured traces, thus playing the part of a filter. At the same time, the tree is also sent to the tester with the definition of the verdicts, calculated by the procedure described in the article by Che et al, "*A logic-based passive testing approach for the validation of communicating protocols*", ENASE 2012 conference, Poland, pages 53 to 64. The tree makes it possible to optimize the calculation of the verdicts while considering the relevant data being transported.

The captured traces may pass through the tree and then be filtered into various data sets. The messages that are not needed, namely those that are not required by the requirements of the protocol, may be filtered into an "Unknown" set and are preferably not taken into consideration in the remainder of the test. This step makes it possible to reduce processing time because needless comparisons on irrelevant messages are avoided.

The filtered traces may be transferred to the tester when the latter has the capacity necessary to continue the test. If the priority of the tester needs to be lowered, in order to unload the processor and/or the memory of the piece of equipment being tested, for example because they need to be used by the user for another task, a workload notification is advantageously emitted with a view to halting the transfer of filtered traces to the tester and store them in memory in the temporary-storage space.

In an alternative or in combination, when the buffer memory of the tester reaches the limit on the amount of data that can be processed, a workload notification may also be emitted in order to interrupt the transfer of filtered traces and store these in the temporary-storage zone. More specifically, when the filtered traces are transferred to the buffer memory of the tester, a function aimed at checking whether this memory is overflowing may be used. If the buffer memory has already reached its maximum capacity, the equipment may be notified in order to redirect the traces to the temporary-storage zone in order to avoid overflow. By contrast, if the buffer memory of the tester is in a stable state, an availability notification may be sent to the temporary-storage zone, to release the stored traces, and to the equipment, to return to the normal trace-transfer process.

The traces are thus filtered twice; by the spanning tree and by the principle of notifying workload.

There are various temporary-storage methods that may be applied depending on the format of the messages of the protocol being tested. If the size of the header of the message is greater than that of the body thereof, namely if there are more control parts than data, the entire message may be stored in memory in the temporary-storage space. By contrast, when the size of the header of the message is less than or equal to the size of the body thereof, namely when there are fewer control parts than data, only the control parts are stored in memory in the temporary-storage space. Storing only the control parts of the traces makes it possible to save memory so as to be able to store more messages, not all of the requirements of a protocol necessarily having need to use the data.

When the tester becomes available again, a new workload notification is preferably emitted to release the traces temporarily stored and continue to transfer new traces. If only the control parts of the traces have been stored, and if the requirements of the protocol need to use the data, then a temporarily inconclusive "temp-NC" verdict may be returned. This verdict may potentially be modified by analyzing data from whole traces once the tester becomes available again. The temporarily inconclusive verdict may then become a PASS or FAIL verdict later on in the test.

The tester advantageously checks whether or not the traces received meet the formalized requirements in order to provide final verdicts, notably by comparing these with the expected behavior of the protocol specified by the formalized properties.

Some properties may be evaluated from traces containing only control parts, or potentially very few data.

The formula evaluation step is advantageously based on the SLD (selective, linear, definite) resolution algorithm.

Method

Another aspect of the subject-matter of the invention is a method for testing a protocol, notably a communications network protocol, running on a piece of equipment, notably the central processing unit of a computer, in which method:
    a sniffer continuously captures traces corresponding to
        sequences of messages of the protocol being tested, said captured traces are filtered using formalized properties of the requirements of the protocol being tested, the filtered traces being notably separated into data and control parts, and said filtered traces are transferred to a tester configured to emit verdicts by checking whether the traces meet the requirements of the formalized properties of the protocol being tested, in which test method, if the tester becomes saturated, a workload notification is emitted so as to interrupt the transfer of the filtered traces to the tester, said traces are at least partially stored in memory in a temporary-storage zone, notably only the control parts thereof, before the transfer of the filtered traces is resumed when the tester becomes available again.

The features listed hereinabove for the test system apply to the test method.

Computer Program Product

Another aspect of the subject-matter of the invention is a computer program product for implementing the method for testing a protocol as described hereinabove, the computer program product comprising instructions so that:

traces, corresponding to sequences of messages of the protocol being tested, are captured continuously, said captured traces are filtered using formalized properties of the requirements of the protocol being tested, the filtered traces being notably separated into data and control parts, and said filtered traces are transferred to a tester configured to emit verdicts by checking whether the traces meet the requirements of the formalized properties of the protocol being tested, the computer program product comprising instructions so that, if the tester becomes saturated, a workload notification is emitted so as to interrupt the transfer of the filtered traces to the tester, said traces are at least partially stored in memory in a temporary-storage zone, notably only the control parts thereof, before the transfer of the filtered traces is resumed when the tester becomes available again.

The features listed hereinabove for the test system apply to the computer program product.

The computer program product may be produced directly in the processor of the equipment being tested.

Figure 2:
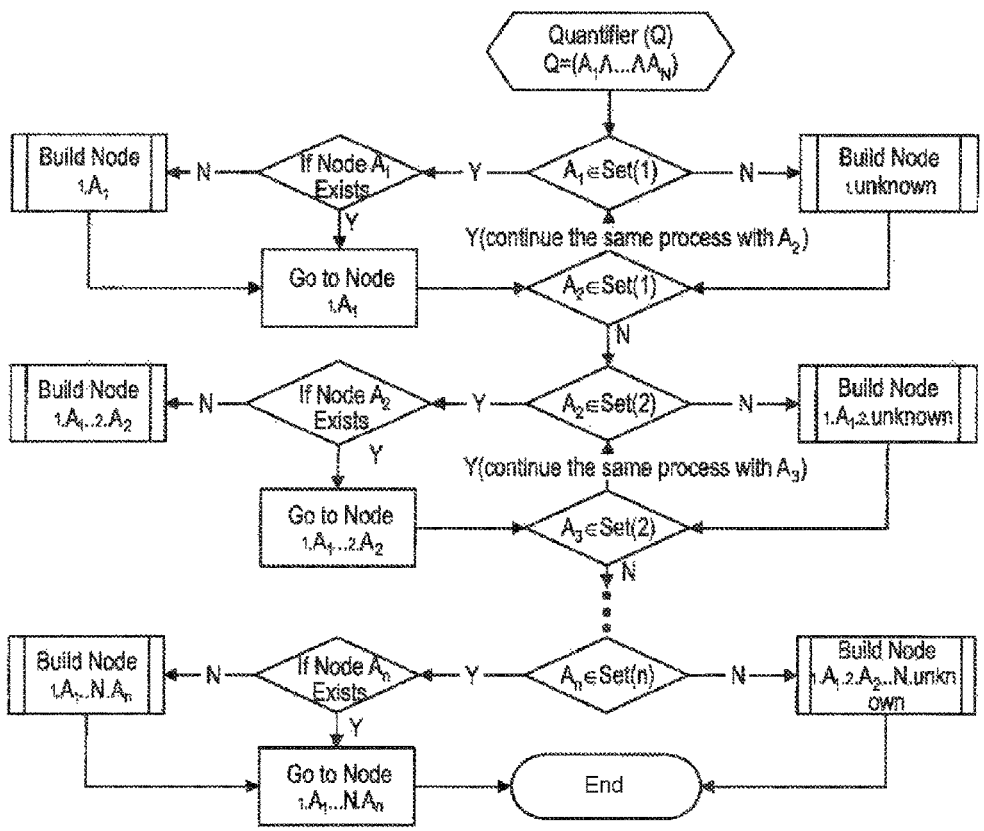
Figure 3:
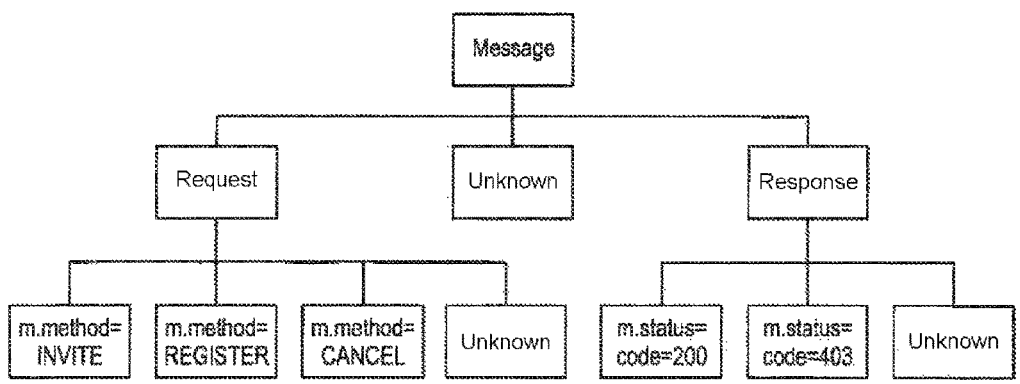
Figure 4:
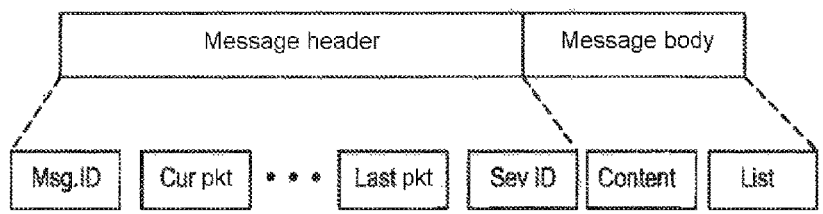
Figure 5:
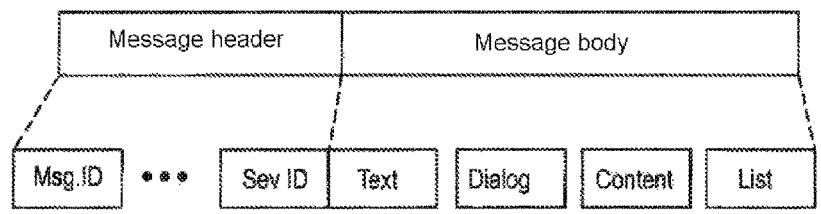
Figure 6:
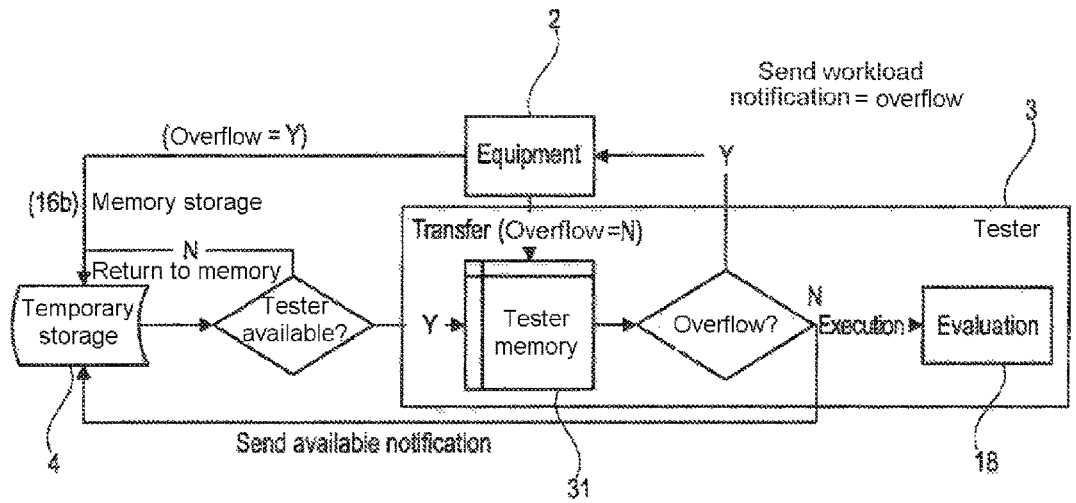
Figure 7:
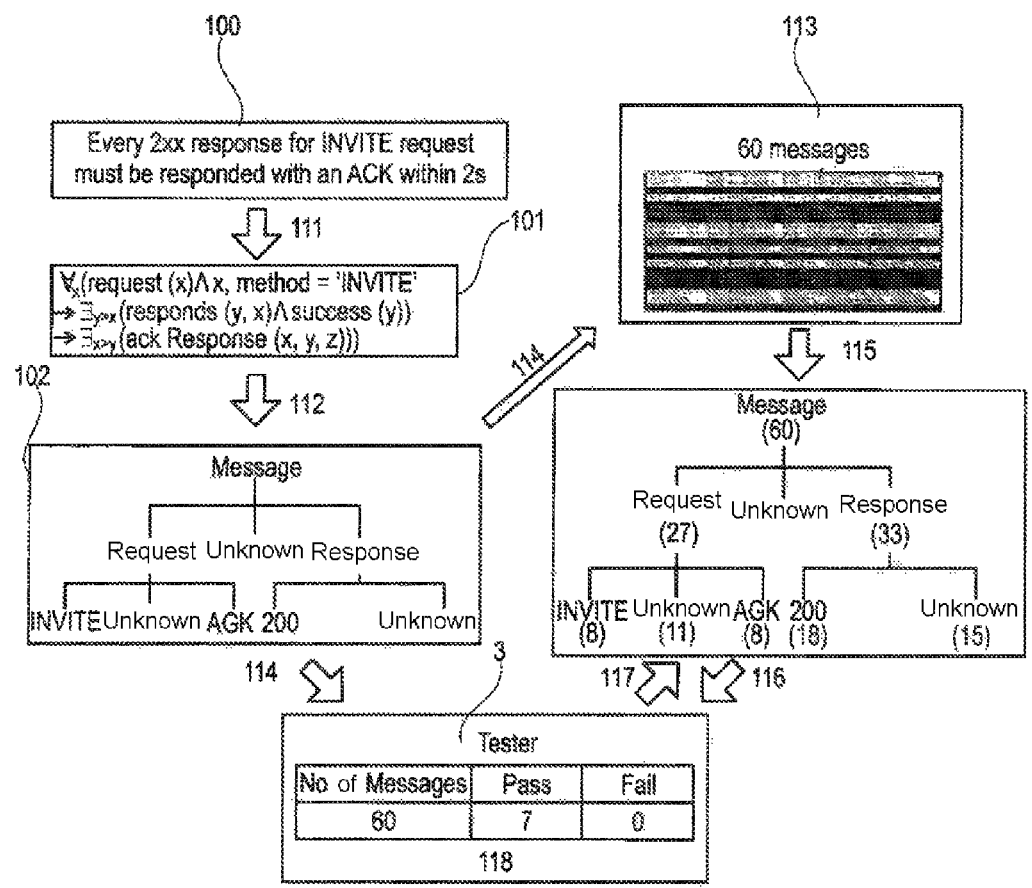
Figure 8:
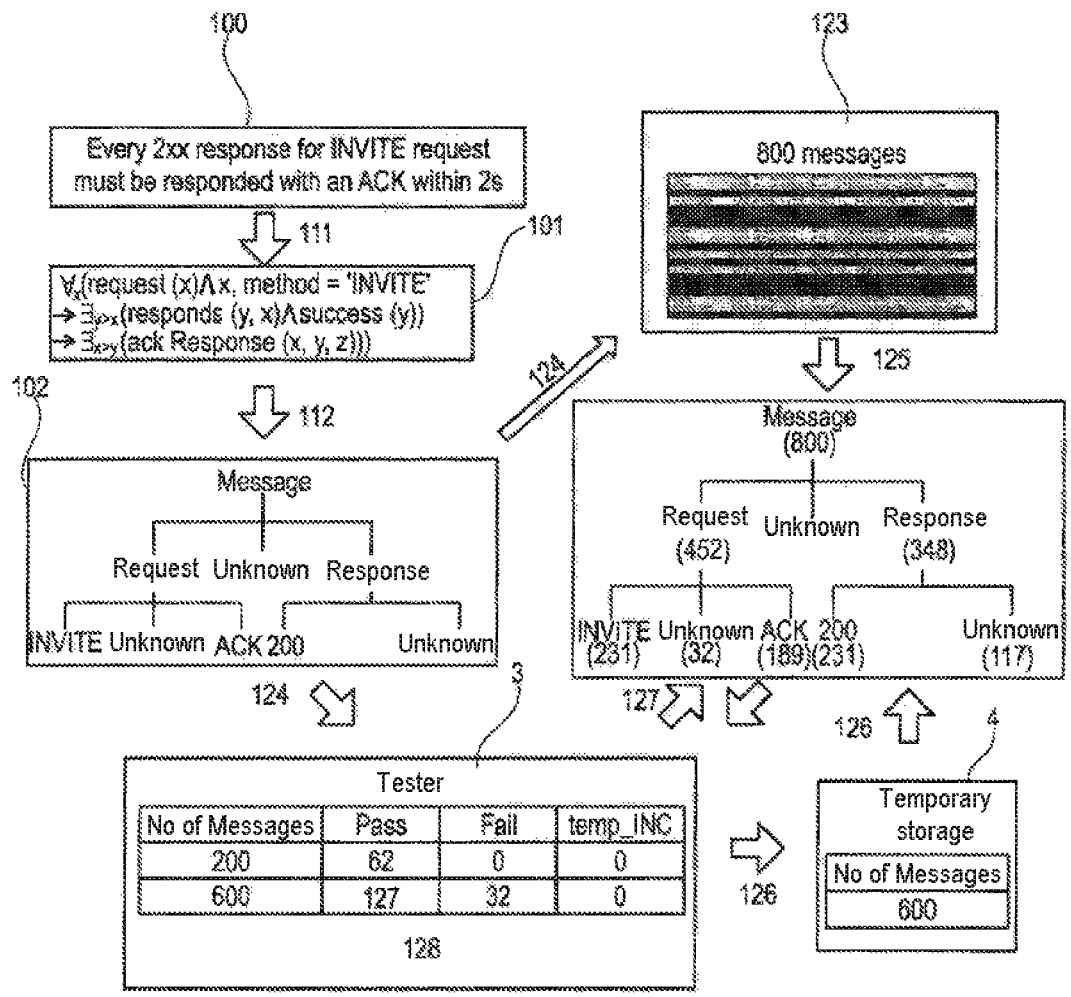

The invention may be better understood from reading the detailed description which will follow, of some nonlimiting exemplary embodiments thereof, and from studying the attached drawing in which:

FIG. 1 is a diagram depicting the architecture of the test system according to the invention, FIG. 2 is a diagram representing the generation of the spanning tree, FIG. 3 depicts examples of filtered messages, FIGS. 4 and 5 depict two types of message, FIG. 6 is a diagram depicting the steps of memory-storage and notification, and FIGS. 7 and 8 depict examples of the testing of a protocol according to the invention.

The architecture of the system 1 for testing a protocol P according to the invention is depicted in FIG. 1. The test system 1 is intended to test a protocol P running on a piece of equipment 2, the protocol P being, for example, the protocol of a communications network, and the equipment 2 the central processor of a computer. In order to do that, the test system 1 comprises a tester 3 configured to emit verdicts V by checking whether the requirements of the properties of the protocol P being tested are met.

The test system 1 is configured to formalize, in a step 11, the requirements 5 of the properties of the protocol P being tested. To do that, in the example described, a syntax and semantic based on Horn logic are used and lead to a set of formulae representing the formalized properties 6. A spanning tree 7 is then constructed, in a step 12, from the set of formulae 6 representing the formalized requirements of the properties of the protocol being tested.

In an alternative form, at least one of the steps of formalizing the requirements 5 of the properties of the protocol P being tested and of constructing the spanning tree 7 is performed by one or more external modules, upstream of the test method, the formulae 6 and/or the spanning tree 7 being supplied, where appropriate, to the test system 1, for example in the form of files.

A sniffer continuously, during a step 13, captures traces 8 from the equipment 2, corresponding to sequences of messages of the protocol P being tested.

The spanning tree 7 is used, in the example described, in a step 14a, to generate a filter to filter the captured traces 8, during a step 15, thus using the formalized properties of the protocol P being tested. The filter is advantageously configured to separate the traces 8 into data and control parts, and to filter out the messages not required by the requirements, which will not be taken into consideration by the tester 3 in evaluating the protocol P.

During an installation step 14b, the spanning tree is also sent to the tester 3 in order to define the verdicts V. This step 14b prepares all the data of the property being tested.

A transfer module in a step 16a transfers the filtered traces 9 to the tester 3 so that it emits verdicts V by checking whether said traces 9 meet the requirements of the formalized properties of the protocol P being tested, during an evaluation step 18.

If the tester 3 becomes saturated, a workload notification Y is emitted, the transfer of the filtered traces to the tester 3 is interrupted and these filtered traces are stored in memory, at least partially, during a step 16b, in a temporary-storage zone 4 of the test system 1.

The tester 3 for example becomes saturated when its priority is lowered, so as to unload the equipment 2 being tested.

In an alternative or in combination, the tester 3 becomes saturated when it reaches a limit on the quantity of traces 9 that can be processed.

When the tester 3 becomes available again, a new workload notification is preferably emitted so as, during a step 16c, to release the traces 9 temporarily stored in memory in the storage zone 4 and continue to transfer new traces.

The traces gathered during the capture step 13 are, in the example described, raw traces from the sniffer. The filtering of step 15 makes it possible to record the streams entering and leaving the protocol P being tested.

Memory-storage of the traces 9 in the temporary-storage zone 4 is advantageously performed using chopping tables.

The tester 3 is configured to emit five types of verdict V: "PASS", "FAIL", "TIME-FAIL", "INC" and "temp-INC". The verdicts V are preferably stored in files.

For preference, all of the steps described hereinabove are performed and, more preferably still, are performed in the order described.

FIG. 2 depicts the procedure for constructing the spanning tree 7 from a formula 6. Each quantifier Q of the formula 6 passes through the tree 7 in order to construct or build the nodes A.

FIG. 3 shows an example of messages of the SIP protocol filtered by the spanning tree 7. According to the SIP standard, a request, within the body of the message, is defined by the "method" field and a response is defined by the "status" field. The messages may therefore advantageously be filtered and stored according to the spanning tree 7. If a message is not recognized (notification "unknown"), it will not, because of the filtering, be retained.

FIG. 4 depicts an example of a message in which the size of the header is greater than that of the body.

FIG. 5 depicts an example of a message in which the size of the header is less than or equal to that of the body. In that case, and if the tester 3 becomes saturated, only the control parts of the filtered traces corresponding to this type of message are stored in memory in the temporary-storage zone 4 during step 16*b*.

FIG. 6 depicts the process of transferring and/or storing in memory the filtered traces 9 depending on the workload on the tester 3. The tester 3 comprises a buffer memory 31 and a function that checks whether said buffer memory 31 is overflowing when filtered traces 9 are transferred to it. If the buffer memory 31 of the tester 3 has already reached its maximum capacity, the equipment 2 receives a workload notification Y in order to redirect the traces 9 to the temporary-storage zone 4 in order to avoid overflow. On the other hand, if the buffer memory 31 of the tester 3 is in a stable state, a notification of availability N is sent to the temporary-storage zone 4 to release the traces stored and to the equipment 2 to return to the normal process of transporting the traces.

FIG. 7 depicts an example of a test according to the invention. The requirement 100 from the protocol P the performance of which is to be tested is "Every 2xx response to an INVITE request must be responded to with an ACK within 2 seconds". This requirement is formalized in step 111 by formula 101. The spanning tree 102 corresponding to this formula 101 is generated during a step 112. The tree 102 is transferred to the processor of the equipment 2 in order to be applied as a filter, in steps 113 and 114, to the captured messages of the protocol P.

As soon as the processor of the equipment 2 has captured a trace of 60 messages, which is filtered in step 115, it will check the value of the workload notification. In the example described, the value of the workload notification is equal to N, which means that the tester 3 is available and that there is no need to temporarily store the traces in memory. The processor sends the filtered traces directly to the tester 3 in step 116.

When the tester 3 receives the trace, it tests it for the property formalized during a step 118 and sends the workload notification value N back to the processor, during step 117, because the tester is still available to test the next traces. Seven "PASS" verdicts are received in the example considered, against zero "FAIL" verdicts.

Another example of a test according to the invention is depicted in FIG. 8. The same requirement being tested 100 is used and formalized in the same way into formula 101, leading to the spanning tree 102. 800 messages are captured and filtered in steps 123 and 124. The processor of the equipment 2 checks the workload notification in step 125. In the example considered, the tester is in a state of low priority which means that it cannot manage a high number of traces at this particular time, so a workload notification value Y is therefore emitted in order to store the additional incoming 600 traces in memory in the temporary-storage zone 106 in a step 126. When the tester 3 has finished testing the first 200 traces it sends a workload notification value N back to the processor and to the storage zone 106, so that the 600 messages stored in memory can, in a step 127, be sent back to the tester 3 so that it can test them. 189 "PASS" verdicts are received in the example considered, and 32 "FAIL" verdicts.

The invention is not restricted to the examples that have just been described.

The equipment 2 being tested may also be equipment containing a protocol cell and a memory space, such as a smartphone, an on-board system, etc.

The test system according to the invention means that a far lower number of comparisons can be performed than in the known methods in order to arrive at the final verdict, for example 26 comparisons as against 89 in the example of FIG. 7.

The field of application of the test system according to the invention is particularly aimed at communication services and protocols engineering. The passive test system may be applied to OSI (Open Systems Interconnection) layers 3 to 7 protocols or to SIP and OLSR (Optimized Link State Routing bearing reference RFC3626) protocols.

The test system according to the invention may be used in communicating systems incorporating protocols or services that may form the subject of monitoring. It is particularly advantageous to be able to test these protocols passively without disturbing the behavior of the communicating system and while at the same time using it for other purposes, such as the integration of other components, simulations, third-party development or performance analysis.

The system according to the invention may be used in network monitoring and analysis tools.

The test system according to the invention may be used in distributed systems or non-distributed systems. In the case of distributed systems, a protocol may be used to synchronize the various pieces of equipment.

The expression "comprising a" is to be understood as being synonymous with "comprising at least a" unless specified to the contrary.

The invention claimed is:

1. A system for testing a communications network protocol, running on a piece of equipment, the test system comprising:
 a temporary-storage memory; and
 a processor operatively coupled to the temporary-storage memory, the processor being configured to function as:
  a sniffer configured to continuously capture traces, corresponding to message sequences of the protocol being tested,
  a captured-traces filter configured to filter the captured traces based on formalized properties of the requirements of the protocol being tested, the formalized properties being derived from at least one standard and/or from a technical specification governing the protocol, and
  a transfer module configured to transfer the filtered traces to a tester that emits verdicts by checking whether the traces meet the requirements of the formalized properties of the protocol being tested, wherein
 the tester is saturated when a priority is lowered and/or when the tester reaches a limit on the quantity of traces that can be processed, and
 if the tester becomes saturated, which leads to the emitting of a workload notification, the transfer module interrupts the transfer of the filtered traces to the tester and at least partially stores the traces in memory in the temporary-storage memory, before resuming the transfer of the filtered traces when the tester becomes available again.

2. The system as claimed in claim 1, wherein the protocol is a communications network protocol.

3. The system as claimed in claim 1, wherein the piece of equipment is the central processing unit of a computer.

4. The system as claimed in claim 1, wherein the captured-traces filter is configured to separate the traces into data and control parts.

5. The system as claimed in claim 4, wherein only the control parts of the filtered traces are stored in memory in the temporary storage memory.

6. The system as claimed in claim 1, wherein an index spanning tree is constructed from the formalized properties of the requirements of the protocol being tested.

7. The system as claimed in claim 6, wherein the captured-traces filter is the index spanning tree.

8. The system as claimed in claim 6, wherein the index spanning tree is also sent to the tester in order to define the verdicts.

9. The system as claimed in claim 1, wherein the captured-traces filter is configured to filter out the messages not required by the requirements, which is not taken into account by the tester.

10. The system as claimed in claim 1, wherein the saturation of the tester is aimed to unload the equipment being tested.

11. The system as claimed in claim 1, wherein the tester comprises a buffer memory and a function that checks whether the buffer memory is overflowing.

12. The system as claimed in claim 11, wherein the tester sends a workload notification to the equipment if the buffer memory of the tester is overflowing, so as to redirect the filtered traces to the temporary-storage memory.

13. The system as claimed in claim 1, wherein
the message sequences of the protocol include a header and a body,
the size of the header of the message sequences of the protocol is less than or equal to that of the body of the message sequences, and
if the tester becomes saturated, only control parts of the filtered traces corresponding to the header of these message sequences are stored in memory in the temporary-storage memory.

14. The system as claimed in claim 1, wherein the tester is configured to emit five types of verdict: "PASS", "FAIL", "TIME-FAIL", "INC" and "temp-INC".

15. The system as claimed in claim 1, wherein the test verdicts are stored in files.

16. The system as claimed in claim 1, wherein the requirements for the properties of the protocol are formalized using syntax and semantics which are based on Horn logic, leading to a set of formulae, from which an index spanning tree is constructed.

17. A method for testing a communications network protocol, running on a piece of equipment, the method comprising:
continuously capturing, by a sniffer, traces corresponding to sequences of messages of the protocol being tested,
filtering the captured traces based on formalized properties of the requirements of the protocol being tested, the formalized properties being derived from the standard and/or from the technical specification governing the protocol, and
transferring the filtered traces to a tester configured to emit verdicts by checking whether the traces meet the requirements of the formalized properties of the protocol being tested, wherein
the tester is saturated when a priority is lowered and/or when the tester reaches a limit on the quantity of traces that can be processed, and
in which test method, if the tester becomes saturated, a workload notification is emitted so as to interrupt the transfer of the filtered traces to the tester, the traces are at least partially stored in memory in a temporary-storage memory, before the transfer of the filtered traces is resumed when the tester becomes available again.

18. The method as claimed in claim 17, wherein the protocol being a communications network protocol.

19. The method as claimed in claim 17, wherein the piece of equipment being the central processing unit of a computer.

20. The method as claimed in claim 17, wherein the filtered traces being separated into data and control parts.

21. The method as claimed in claim 20, wherein only the control parts of the filtered traces are stored in memory in the temporary storage memory.

22. A non-transitory computer readable medium storing a computer program for testing a communications network protocol, the computer program causing a computer to execute steps comprising:
continuously capturing traces, corresponding to sequences of messages of the protocol being tested,
filtering the captured traces based on formalized properties of the requirements of the protocol being tested, the formalized properties being derived from the standard and/or from the technical specification governing the protocol, and
transferring the filtered traces to a tester configured to emit verdicts by checking whether the traces meet the requirements of the formalized properties of the protocol being tested, wherein
the tester is saturated when a priority is lowered and/or when the tester reaches a limit on the quantity of traces that can be processed, and
if the tester becomes saturated, a workload notification is emitted so as to interrupt the transfer of the filtered traces to the tester, the traces are at least partially stored in memory in a temporary-storage memory, before the transfer of the filtered traces is resumed when the tester becomes available again.

23. The non-transitory computer readable medium as claimed in claim 22, wherein the filtered traces are separated into data and control parts.

24. The non-transitory computer readable medium as claimed in claim 23, wherein only the control parts of the filtered traces are stored in memory in the temporary storage memory.

* * * * *